Jan. 16, 1940. R. J. MacKENZIE ET AL Re. 21,324
MUFFLER
Original Filed July 8, 1936 2 Sheets-Sheet 1
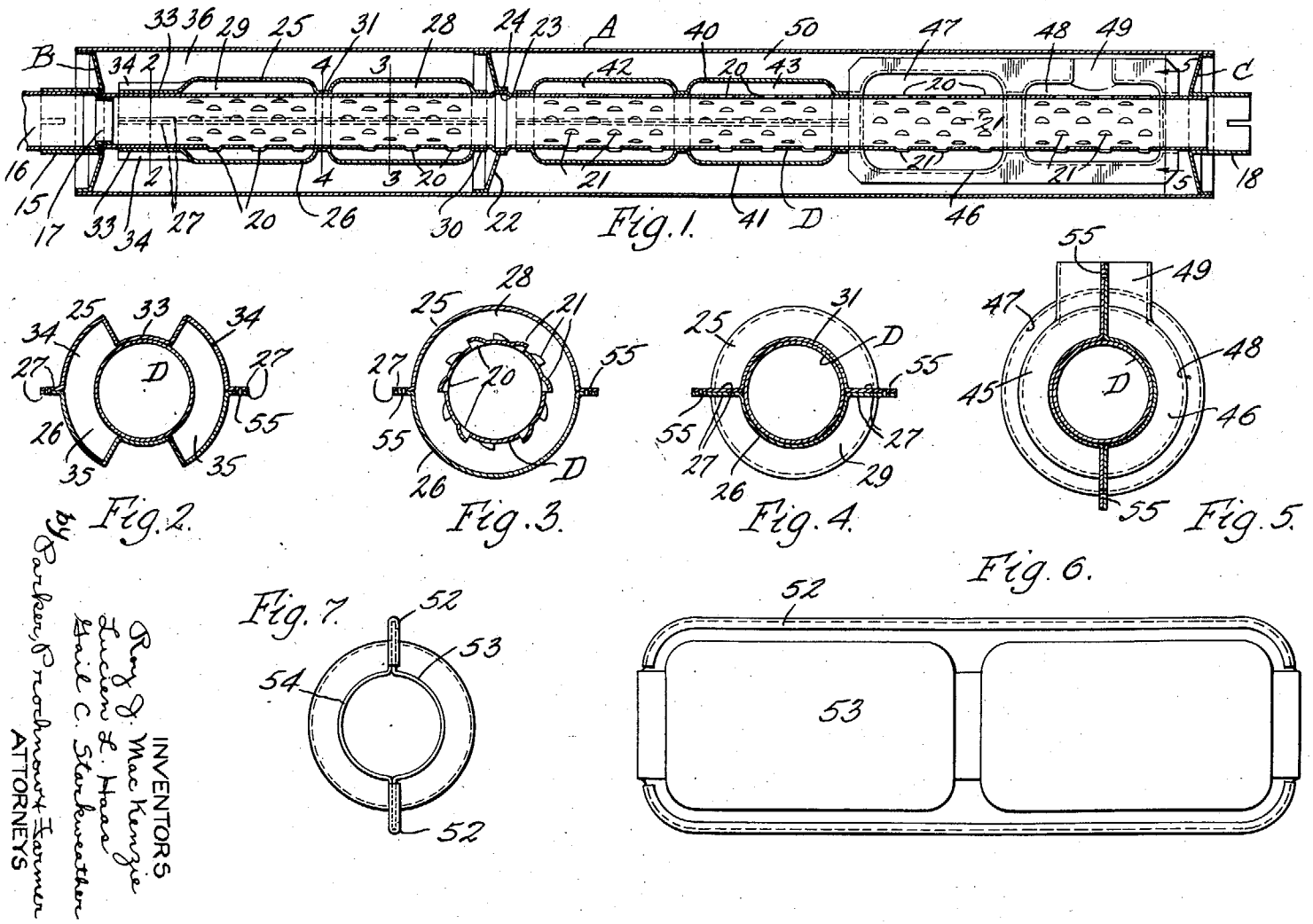
INVENTORS
Roy J. MacKenzie
Lucien L. Haas
Gail C. Starkweather
by Parker, Prochnow & Farmer
ATTORNEYS Jan. 16, 1940. R. J. MacKENZIE ET AL Re. 21,324

MUFFLER

Original Filed July 8, 1936 2 Sheets-Sheet 2

INVENTORS
Roy J. MacKenzie
Lucien L. Haas
Gail C. Starkweather
by Parker, Prochnow & Farmer
ATTORNEYS Reissued Jan. 16, 1940

Re. 21,324

UNITED STATES PATENT OFFICE 21,324

MUFFLER

Roy J. MacKenzie, Lucien L. Haas, and Gail C. Starkweather, Youngstown, Ohio, assignors to Buffalo Pressed Steel Company, Buffalo, N. Y.

Original No. 2,115,113, dated April 26, 1938, Serial No. 89,606, July 8, 1936. Application for reissue June 22, 1938, Serial No. 215,240

15 Claims. (Cl. 181—48)

This invention relates to improvements in mufflers such, for example, as are used for silencing the exhaust from internal combustion engines, and more particularly to mufflers of this kind having chambers formed between pairs of shells.

One of the objects of this invention is to provide a muffler of improved and simplified construction for forming a chamber between two shells.

Another object of this invention is to provide a muffler having a shell divided lengthwise of its axis into a plurality of sections or parts, which may be secured together to form the completed shell.

Another object is to provide a shell of this type which is formed to be secured to and supported by another shell.

Another object of this invention is to provide a longitudinally divided shell which takes the place of a cylindrical shell and two or more baffles for mounting the shell on another shell.

A further object of this invention is to so form a split or sectional shell that the chamber formed by such shell with another shell is connected by a passage with another chamber to form a bottle neck type of resonator chamber.

Another object of this invention is to provide a split shell with a joint or connection between the two parts of the shell, which is grooved or channeled to form a passage for sound waves.

Other objects of this invention will be apparent from the following description and claims.

In the accompanying drawings:

Fig. 1 is a longitudinal, central, sectional view of a muffler provided with sectional shells embodying this invention.

Figs. 2, 3, 4 and 5 are transverse sections thereof, respectively on lines 2—2, 3—3, 4—4 and 5—5, of Fig. 1.

Fig. 6 is a side view of a sectional muffler shell of modified construction.

Fig. 7 is an end view thereof.

Figure 10:
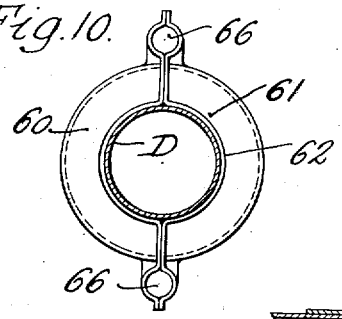
Fig. 10 is a section of a portion thereof, on line 10—10, Fig. 9.

Fig. 1 illustrates, by way of example, a muffler in which three forms of sectional shells embodying this invention are employed, and this muffler includes an outer shell A, end heads B and C, and a perforate inner conduit D. The end head B may be provided with the usual integral tubular extension 15 telescopically connected with an exhaust pipe 16. The head B is also provided with a short, tubular part 17 secured within the tubular extension 15 of the head B and telescoping into one end of the inner shell or conduit D. The other head C is provided with a tubular extension or part 18 with which the usual tail pipe (not shown) is telescopically connected, and this tubular part 18 also receives the discharge end of the inner shell or conduit D. The conduit D, in the construction shown, is provided with groups of perforations or apertures 20 having louvres 21 formed of the metal of the inner shell or conduit bent outwardly at the apertures 20 in such a manner that gases passing out of the inner shell or conduit through the apertures 20 will be discharged substantially in a tangential direction with relation to the conduit D. It will be understood, however, that apertures of any other shape or size and with or without louvres may be employed through which gases may flow into and out of the inner shell or conduit. 22 represents a baffle extending from the inner shell or conduit D to the outer shell A, which divides the space immediately within the outer shell into two chambers. The inner shell or conduit is preferably provided with an annular outwardly bent or formed rib or projection 23 which extends outwardly beyond the outer edges of the louvres 21 and to which the inner flange 24 of the baffle 22 may be secured. By means of this outwardly extending projection 23, the inner diameter of the flange 24 of the baffle can be made large enough so that the conduit may be passed through the hole in the baffle without interference by the louvres and the flange 24 will then fit tightly around the annular raised rib or projection 23.

In mufflers of this type, it is customary to provide an intermediate shell or shells arranged about the conduit D within the outer shell A, and these intermediate shells are connected with the inner or outer shells by means of baffles which are generally welded to the shells which they connect. We have found that it is more desirable under certain conditions to employ one or more intermediate shells, each of which may be made in sections or parts having longitudinal edges or flanges which may be connected or secured together to form the complete shell. These sections also have integral shoulders or parts connected with another shell or conduit.

At the left-hand end of Fig. 1, between the head B and the baffle 22 is arranged a split shell according to our invention which, as clearly shown in Figs. 2, 3 and 4, consists of two sections or half shells 25 and 26, both of these half shells being provided with laterally extending flanges 27 which may be readily secured together by welding or other means. The split intermediate shell shown in this portion of the muffler is shaped to form two chambers 28 and 29, and at the outer end of the chamber 28, the shell is provided with an inwardly extending shouldered or offset portion terminating in a substantially cylindrical flange 30 which is arranged to engage, for example, an imperforate portion of the inner shell or conduit. At the other end of the chamber 28, the metal of the intermediate shell is also depressed inwardly and forms another annular shoulder or offset 31 also engaging and secured to a portion of the inner shell or conduit. At the left end of the chamber 29 in Fig. 1, portions of the intermediate shell are depressed toward the inner shell or conduit, as shown at 33, and may be welded or otherwise secured to the conduit D. Other portions 34 of this end of the split intermediate shell are not deformed or bent into contact with the inner conduit D, and these portions, consequently, form, with imperforate portions of the conduit D, channels or bottle necks 35. These bottle necks or channels connect the chamber 29 between the split intermediate shell and the conduit D with a chamber or space 36 arranged between the intermediate shell and the outer shell A. The length as well as the cross sectional area of these channels or bottle necks 35 can, of course, be very easily varied, so as to silence, by destructive interference, certain sound waves passing into the muffler from the exhaust pipe.

In the middle portion of the muffler shown in Fig. 1, an inner shell is shown which is formed of two halves or sections 40 and 41 constructed to form two chambers 42 and 43, each closed at both ends similar to the chamber 28, which has been described. Chambers of this kind may be used to cooperate with the inner shell or conduit and with the perforations therein to silence high frequency sound waves. The chambers 42 and 43 are closed at their ends by inwardly curved shoulder portions of the two sections 40 and 41, which inwardly curved portions also engage portions of the inner shell or conduit D for supporting the sections 40 and 41 of the intermediate shell on the conduit D, as well as closing the ends of the chambers 42 and 43.

At the right-hand end of the muffler shown in Fig. 1, still another form of intermediate shell is illustrated. This shell comprises two sections 45 and 46, see Fig. 5, secured together by flanges as already described. In this case, the sections of the intermediate shell form a high frequency chamber 47 of larger diameter than the chambers 28, 42 and 43 and, which may, consequently, be used in silencing another band of frequencies other than that silenced in the chambers 28, 42 and 43. This chamber 47 is closed at opposite ends by integral shouldered portions. The sections 45 and 46 also form another chamber 48 about the inner shell or conduit D, and in this case, the chamber 48 also communicates with the space between the intermediate shells and the outer shell A by means of a short channel or bottle neck 49. Half of this channel is formed in the flange of one of the sections of the intermediate shell, and the other half is formed by the other section, the two halves of the channel being arranged to form a complete substantially cylindrical channel 49 as shown in Fig. 5. It will be readily seen that the cross sectional area and shape of this channel can be readily varied, as may be required, to produce the desired silencing action in connection with the outer resonator chamber 50 which is formed between the outer shell A and the intermediate shells, and between the baffle 22 and the head C.

In Figs. 6 and 7, a split or sectional muffler shell is shown which is very similar to the shells 40 and 41 shown in Fig. 1, except that in Figs. 6 and 7, the outer edge of one of the flanges of the two sections is turned over the edge of the other flange, as shown at 52, to form a seam connecting the flanges of the two sections 53 and 54 of the shell. In the construction of the various shells shown in Fig. 1, the flanges of the sections of the shell are described as being welded together, and this may be done as indicated in Figs. 2–5 inclusive, at 55.

Figure 8:
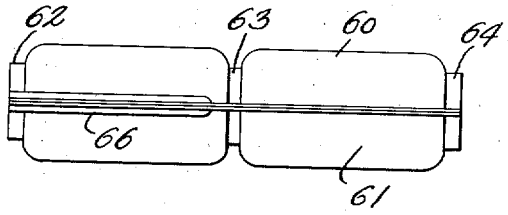
Fig. 8 is a side view of a sectional muffler shell of still another modified form.
Figure 9:
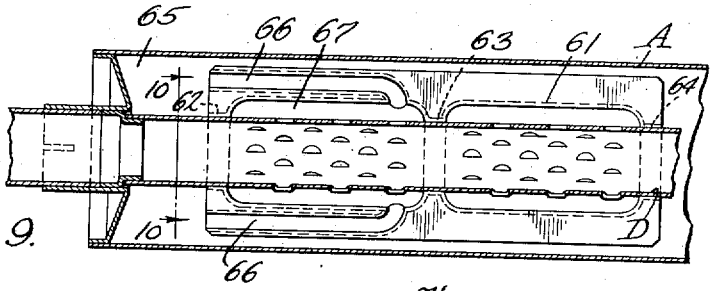
Fig. 9 is a fragmentary, longitudinal, sectional view of a muffler having a sectional shell of modified construction arranged therein.

In Figs. 8 to 10, still another modified form of a sectional muffler shell is shown. In this construction, the shell has two sections 60 and 61, the flanges of which are secured together about the inner shell or conduit, three shouldered portions 62, 63 and 64 being provided which extend into engagement with the inner shell or conduit D. The portions of the two sections between the two shoulders 63 and 64 form about the perforate portion of the conduit D an annular closed resonator chamber. The portions of the sections between the shoulders 62 and 63 form a chamber which communicates with an outer chamber 65, Fig. 9, by means of passages or bottle necks 66 formed by means of oppositely disposed grooves in each of the flanges of the two muffler sections 60 and 61. The construction shown in this figure is particularly suitable for use in connection with the silencing of certain sound waves or bands of sound waves, since it will be obvious that the cross sectional area of the passages 66, as well as the lengths of these passages, may be varied according to the sound waves to be silenced. In the form shown in these figures, the passages or bottle necks 66 are approximately of maximum length. If shorter passages or bottle necks are desired, the inner ends of these passages may terminate in the space or chamber 67 between the sectional shell and the conduit at different distances from the inner end of the chamber 67.

Figure 11:
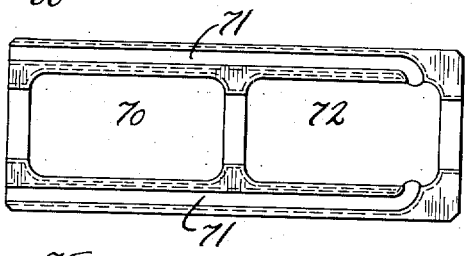
Fig. 11 is a face view of one section or part of a shell of another modified construction.

If a still longer passage or bottle neck is required to produce the desired silencing effects, the construction shown in Fig. 11 may be used, in which one-half of a split shell is shown which differs from the shell shown in Figs. 8 to 10, in that a chamber 70 is formed at the left-hand portion of the shell and in which the passages or bottle necks 71 communicate with a chamber 72 located at the right-hand end of the split shell. In this construction, the length of the passages 71 may be varied by terminating the inner ends of the passages at different portions of the chamber 72. This construction results in a passage or bottle neck of about twice the length of the one shown in Figs. 8 to 10.

Figure 12:
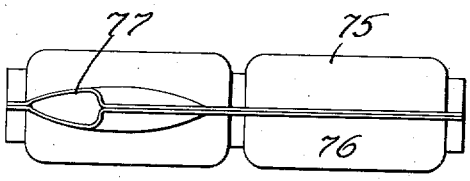
Fig. 12 shows another modified form of sectional muffler shell.
Figure 13:
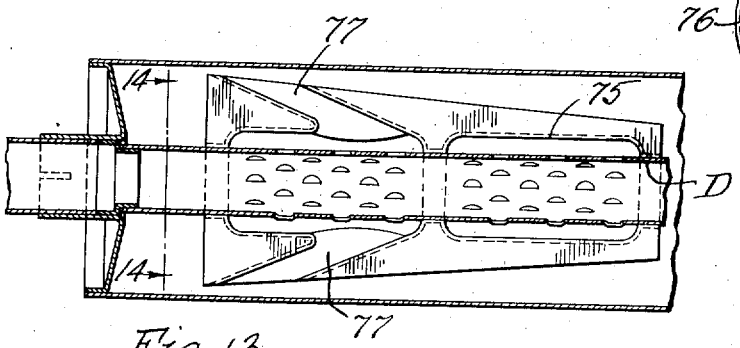
Fig. 13 is a fragmentary, longitudinal, central, sectional view of a muffler having the shell shown in Fig. 12 installed therein.
Figure 14:
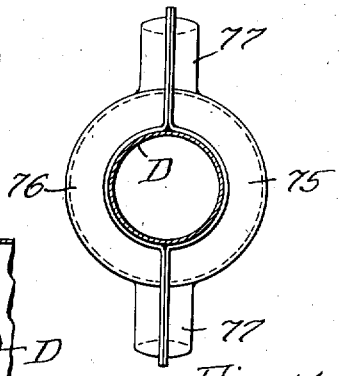
Fig. 14 is a transverse, sectional view thereof, on line 14—14, Fig. 13.

Figs. 12 to 14 show a sectional shell formed in two sections 75 and 76, the flanges of which are formed to provide inclined passages or bottle necks 77 which terminate at their outer ends in the side edges of the flanges of the two sections of the shell.

It will be obvious from the foregoing description that the mufflers embodying this invention may be varied greatly, not only with reference to the construction and shape of the sectional shells, but also the sectional shells may be used in connection with the usual cylindrical shells and baffles heretofore commonly employed. It will also be understood that while the sectional shells are herein illustrated as used in connection with an inner shell or conduit, they may equally well be used in connection with another shell arranged about the inner shell. The sectional shells may, if desired, be formed of more than two sections.

The construction described has the advantage that the sectional shells may be readily applied to an inner shell having outwardly projecting louvres such as illustrated in Fig. 3 without necessitating an outwardly extending annular ridge, such as the ridge 23 shown in Fig. 1, since the sections of the shell are preferably first placed into operative relation to each other about the inner shell and are then secured to each other and to the inner shell, so that it is not necessary to slide the completed sectional shell lengthwise of the inner shell into its operative position, although, if desired, in connection with inner shells having no outwardly extending projections or louvres, the several sections of the shell may be first secured together and then slid lengthwise of the inner shell into its correct position.

By forming shells in sections as herein described, and by forming shoulders on the sections, which may extend into engagement with another shell, the use of two or more baffles connecting two telescoping shells is eliminated, and furthermore, the provision of passages or bottle necks in the connecting flanges of the sections results in an inexpensive construction for producing such bottle necks. The sections of the shell are, of course, most readily formed from flat sheets of metal by pressing the same into the desired shapes by means of dies.

We claim as our invention:

1. A muffler including an inner shell having a perforate portion, an outer shell, and an intermediate shell arranged about said perforate portion of said inner shell, said intermediate shell including a plurality of sections which are substantially coextensive longitudinally and which have their longitudinal edge portions connected to each other to form a complete shell, said sections having integral end portions extending into engagement with said inner shell and having a portion intermediate of its ends which extends into engagement with said inner shell, whereby said intermediate shell is supported from said inner shell and forms therewith chambers separated from each other, said intermediate shell also forming at least a portion of the inner wall of another sound deadening chamber.

2. A muffler including an inner shell having a plurality of groups of perforations arranged lengthwise of said shell and separated by an annular imperforate zone, an outer shell, and an intermediate shell arranged about said groups of perforations, said intermediate shell including a plurality of sections having flanged longitudinal edge portions connected to each other to form a complete shell and having integral end portions extending into engagement with said inner shell beyond said groups of perforations and having an integral portion intermediate of its ends which extends into engagement with said imperforate zone between said groups, whereby said intermediate shell is supported from said inner shell and whereby inner chambers separated from each other are formed about said inner shell, said intermediate shell also forming at least a part of the inner wall of another sound deadening chamber.

3. A muffler including an inner shell having a perforate portion, an outer shell, and an intermediate shell arranged about said perforate portion of said inner shell and including a plurality of sections having flanges at their longitudinal edges, the flanges of adjacent sections being secured together to form a shell enclosing said perforate portion, annular portions of said sections extending into engagement with said inner shell for supporting said intermediate shell on said inner shell, said intermediate shell being provided with an opening forming a passage connecting the space between said inner and intermediate shells with a space formed between said intermediate and outer shells.

4. A muffler including an inner shell having a perforate portion, an outer shell, and an intermediate shell arranged about said perforate portion of said inner shell and forming therewith a high frequency resonator chamber, said intermediate shell including a plurality of sections connected to each other at longitudinal edge portions thereof and having end portions extending into engagement with said inner shell for supporting said intermediate shell on said inner shell and for forming end walls of said resonator chamber, said intermediate shell also forming with said outer shell a low frequency resonator chamber.

5. A muffler including an inner shell having a plurality of groups of perforations arranged lengthwise of said shell and separated by an annular imperforate zone, an outer shell, and an intermediate shell arranged about said groups of perforations, said intermediate shell including a plurality of sections having longitudinal edge portions connected to each other to form a complete shell and having end portions extending into engagement with said inner shell beyond said groups of perforations and having a portion intermediate of its ends which extends into engagement with said imperforate zone between said groups, whereby said intermediate shell is supported from said inner shell and whereby high frequency resonator chambers separated from each other are formed about said inner shell, said intermediate shell also forming with said outer shell a resonator chamber for low frequency sound waves.

6. A muffler including an inner shell having a perforate portion, an outer shell, and an intermediate shell arranged about said perforate portion of said inner shell and including a plurality of sections having flanges at their longitudinal edges, the flanges of adjacent sections being secured together to form a shell enclosing said perforate portion, the ends of said sections extending into engagement with said inner shell for supporting said intermediate shell on said inner shell, a portion of a flange of one section being spaced from the flange of an adjacent section to form a passage connecting the chamber between said inner and intermediate shells with an outer chamber formed between said intermediate and outer shells and forming with said outer chamber a bottle neck resonator chamber.

7. A muffler including an inner shell having a plurality of groups of perforations arranged lengthwise of said shell and separated by annular imperforate zones, an outer shell, and an intermediate shell arranged about said groups of perforations, said intermediate shell including a plurality of sections having longitudinal edge portions provided with outwardly extending flanges, the flanges of adjacent sections being secured together to form a shell enclosing adjacent groups of perforations, said sections having end portions extending inwardly into contact with said inner shell, and a portion intermediate of said ends which extends into contact with an imperforate zone of said inner shell, whereby said intermediate shell forms with said inner shell a plurality of chambers, a portion of the flanges of said sections adjacent to one of said chambers being spaced apart to form a passage from said chamber to a chamber formed between said intermediate and outer shells.

8. A muffler including an inner perforate shell, an outer shell, and an intermediate shell arranged between said inner and outer shells and including a plurality of sections having longitudinal edge portions connected to each other to form a complete shell and having end portions and an intermediate portion extending into engagement with said inner shell for supporting said intermediate shell on said inner shell and for forming with said inner shell a plurality of chambers, a portion of the flanges of said sections adjacent to one of said chambers being spaced apart to form a bottle neck passage from said chamber to a chamber formed between said intermediate and outer shells.

9. A muffler including an inner shell having a perforate portion, an outer shell, and an intermediate shell arranged about said perforate portion of said inner shell and including a plurality of sections having flanges at their longitudinal edges, the flanges of adjacent sections being secured together to form a shell enclosing said perforate portion, the ends of said sections extending into engagement with said inner shell for supporting said intermediate shell on said inner shell, and to form a chamber between said inner and intermediate shells, an end of one of said sections having a longitudinal portion thereof spaced from an imperforate portion of said inner shell to form therewith a bottle neck passage connecting said chamber with a chamber formed between said intermediate and outer shells.

10. A muffler including an inner shell having a perforate portion, an outer shell, and an intermediate shell arranged about said perforate portion of said inner shell and including a plurality of sections having flanges at their longitudinal edges, the flanges of adjacent sections being secured together to form a shell enclosing said perforate portion, the ends of said sections extending into engagement with said inner shell for supporting said intermediate shell on said inner shell, and for forming a chamber between said inner and intermediate shells, at least one of said flanges having a groove in the face thereof adjacent to an adjoining flange of another section, said groove terminating at one end thereof in said chamber and at the other end thereof in the space between said outer and intermediate shells to form with an adjacent flange a passage connecting said chamber with said space.

11. A muffler including an inner shell having a perforate portion, an outer shell, and an intermediate shell arranged about said perforate portion of said inner shell and including a plurality of sections having flanges at their longitudinal edges, the flanges of adjacent sections being secured together to form a shell enclosing said perforate portion, the ends of said sections extending into engagement with said inner shell for supporting said intermediate shell on said inner shell and for forming a chamber between said inner and intermediate shells, a pair of adjacent flanges being provided with grooves facing each other and extending from said chamber to the outer edges of said flanges, said grooves together forming a bottle neck passage connecting said chamber with a chamber formed between said intermediate and outer shells.

12. A muffler including an inner shell having a perforate portion, an outer shell, and an intermediate shell arranged about said perforate portion of said inner shell and forming therewith an inner chamber, said intermediate shell including a plurality of longitudinal sections each extending from end to end of said intermediate shell and having their longitudinal edge portions secured together and having portions extending into engagement with said inner shell for supporting said intermediate shell on said inner shell and forming end walls of said inner chamber, said intermediate shell also dividing the space between said inner shell and said outer shell into separate chambers.

13. A muffler including an inner shell having a perforate portion, an outer shell, an intermediate shell arranged about said perforate portion of said inner shell and forming therewith an inner chamber, said intermediate shell including a plurality of longitudinal sections each extending from end to end of said intermediate shell and having their longitudinal edge portions secured together and having portions extending into engagement with said inner shell for supporting said intermediate shell on said inner shell and for forming end walls of said inner chamber, said intermediate shell also forming with the outer shell an outer chamber, said intermediate shell being provided with an opening establishing communication between said inner and outer chambers.

14. A muffler including three shells arranged one within another and spaced radially from each other, end walls connecting the inner and outer of said shells, an intermediate wall arranged between said end walls and also connecting the inner shell with the outer shell, the inner of said shells having a perforate portion, the intermediate of said shells being arranged about said perforate portion and positioned between one of said end heads and said intermediate wall, said intermediate shell including a plurality of longitudinal sections each extending from end to end of said intermediate shell and having their longitudinal edge portions provided with flanges which are secured together to form a continuous intermediate shell encircling a portion of said inner shell, each of said sections having portions extending into engagement with said inner shell for supporting said intermediate shell from said inner shell and forming end walls for a chamber formed between said inner and intermediate shells, said intermediate shell also forming at least a part of the inner wall of a chamber formed between said intermediate and outer shells.

15. A muffler including an inner shell having perforate and imperforate zones of its wall spaced apart in a direction lengthwise thereof, an outer shell, and an intermediate shell disposed within and spaced largely from said outer shell, encircling said inner shell, and having a plurality of zones thereof spaced apart in a direction lengthwise thereof and constricted into supporting engagement with imperforate zones of said inner shell, at least one of said constricted zones being formed intermediate of the ends of the intermediate shell, some of said constricted zones being in approximate contact with said inner shell throughout approximately the entire periphery of the latter to form separated chambers between the inner and intermediate shells on opposite sides of a constriction, said intermediate shell being split lengthwise from end to end to enable application over the inner shell in a direction laterally thereto, and having abutting flanges along and substantially continuous with the split on opposite sides thereof, that extend outwardly of said intermediate shell, whereby said intermediate shell may be easily fitted over an inner shell having an irregular outer surface.

ROY J. MACKENZIE.
LUCIEN L. HAAS.
GAIL C. STARKWEATHER.